United States Patent [19]

Ferguson et al.

[11] Patent Number: 4,964,122
[45] Date of Patent: Oct. 16, 1990

[54] TDM DATA TRANSMISSION SYSTEM

[75] Inventors: Stephen P. Ferguson; Allan D. Berry, both of Coventry, United Kingdom

[73] Assignee: GEC-Plessey Telecommunications Limited, England

[21] Appl. No.: 346,126

[22] Filed: May 2, 1989

[30] Foreign Application Priority Data

May 9, 1988 [GB] United Kingdom ............... 8810948

[51] Int. Cl.$^5$ ............................................. H04J 3/07
[52] U.S. Cl. .................................. 370/102; 371/50.1; 370/105.1
[58] Field of Search ................... 370/55, 82, 102, 106, 370/97; 371/49, 50, 53, 63

[56] References Cited

U.S. PATENT DOCUMENTS

| | | | |
|---|---|---|---|
| 3,404,372 | 10/1968 | Robbins ............................... | 371/49 |
| 4,644,529 | 2/1987 | Amstutz et al. ..................... | 370/60 |
| 4,660,202 | 4/1987 | Woodsum ............................ | 371/50 |
| 4,719,624 | 1/1988 | Bellisio ............................... | 370/100 |
| 4,835,768 | 5/1989 | Hubbard et al. .................... | 370/106 |

Primary Examiner—Douglas W. Olms
Assistant Examiner—Christopher O. Edwards
Attorney, Agent, or Firm—Kirschstein, Ottinger, Israel & Schiffmiller

[57] ABSTRACT

A system for transmitting digital data by time division multiplex (TDM) includes a transmission terminal for transmitting a TDM data stream having a frame structure which includes fixed stuff bytes and/or frame overheads forming part of the payload but not normally available to the user. The system includes a processor for locating said fixed stuff bytes, and overwriting at least some of the fixed stuff bytes to introduce mark parity, and a receive terminal having a processor for detecting the introduced parity bytes and determining whether or not there has been an error in transmission. The processor at the receive terminal includes an AND-gate to which the transmitted TDM signal containing mark parity is fed, a clock for supplying a clock signal to the AND-date, a bistable flip-flop connected to the output of the AND-gate, and a band pass filter for filtering the output of the AND-gate.

3 Claims, 2 Drawing Sheets

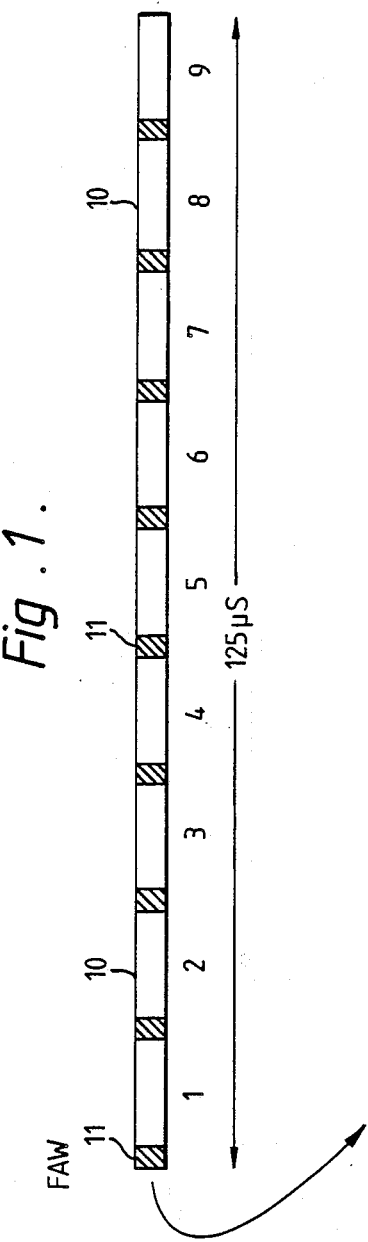
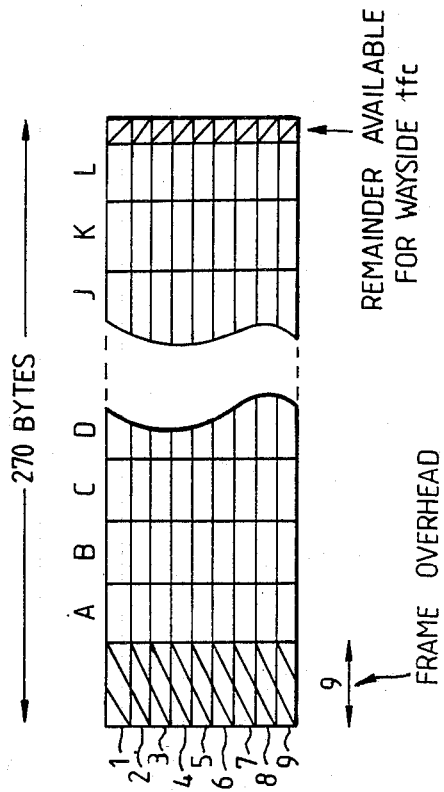

TDM DATA TRANSMISSION SYSTEM

BACKGROUND OF THE INVENTION

1. Field of the Invention

The present invention concerns the transmission of digital data and in particular the transmission of such data by Time Division Multiplex (hereinafter referred to as TDM).

2. Description of Related Art

In TDM Data Transmission Systems a plurality of separate digital signals at various frequencies are combined at a transmission terminal into a single data stream of higher frequency. The original separate signals, known as tributaries, are interleaved at the transmission terminal so that in the final multiplexed signal one or more symbols from one tributary are separated by same from each of the other tributaries until the next symbol(s) of that tributary appear(s). In effect the Multiplexed signal is divided into frames of equal length, each frame being defined by a fixed set of bits known as a frame word and containing, along with various overhead bits, a single symbol/group of symbols from each of the tributaries. At the reception end the interleaved signals have to be "disentangled" and sent on to the appropriate output tributaries.

It will be apparent that any errors occurring during transmission of the Multiplexed data stream can cause extreme problems at the reception end as the breakdown of the Multiplexed data stream into its component parts requires absolute accuracy.

Thus in order to monitor the performance of a digital transmission system it is necessary to detect at the receive terminal any errors produced by the system when in service. The errors can be caused by a number of different factors and at any location along the transmission route. Thus errors can be caused by a faulty dependent repeater or regenerator.

One method by which errors of this nature can be detected utilizes the fact that in some digital transmission systems the line signals are arranged or can be converted into a format resulting in what may be termed constant accumulated disparity signals. An example as to how such signals can be used to detect errors is given in British Patent Specification No. 1536337.

However the ability to use an error detection system such as is proposed in British Patent No. 1536337 is dependent on the nature of the framework or basic structure of the Multiplexed coded signal. These structures are, because of the need to maintain compatible standards internationally, usually defined by an internationally supported body known as the CCITT.

For 2 Megabits traffic, a structure has been defined by the CCITT which is suitable for the purposes of switching, signalling and with minimal extra processing, transmission, with a growing range of support functions being defined to use the spare channel capacity. A further set of recommendations by the CCITT define a frame structure which is even better for these purposes and for bit rates from 2 Mbit/s to many Gbits/s. These recommendations originated in the North American SONET standard, and were agreed at Seoul in February 1988. Hereinafter the new standard will be referred to as SDH.

SDH is based on a module with a bearer rate at 155.52 Mbit/s, carrying a payload of 150.336 Mbit/s. The payload can be formed in a variety of ways, and three particular options are optimised for supporting N. American and European bit rates (1.5 to 45, 2 to 34 Mbit/s, and 140 Mbit/s respectively).

The new structure is designed for low cost switching at many levels of bandwidth, from 64 kbit/s to Gbit/s rates. SDH networks can run more efficiently because bandwidth can be readily allocated down to customer level by remote control, and can be steered around the network in large or small blocks to allow for maintenance, protection and traffic loading.

The introduction of the CCITT recommendations is expected to lead to substantial cost reductions. Direct reductions occur because of the integration of so many functions which becomes possible in one equipment, because of the simplification of equipment interfaces, and because of the economies from having one world standard for manufacturers. Indirect reductions occur because the new switching potential allows optimum allocation of network capacity, with the additional costs of switches being much less than the perceived saving in operating costs, produced for example by not needing site visits to change customer facilities.

However the SDH structure lacks any simple means of locating errors in regenerators. The only available technique is to detect each frame and to compute parity. The higher the rate of data transmission the more and more expensive in terms of heat and power does this solution become. The problem is that frame overheads in SDH do not give enough capacity for effective mark parity. Thus in SDH 38 bytes are allocated for national use. This is equivalent to 1 in 64 bytes and is inadequate with low-cost implementations for the purpose of mark parity.

SUMMARY OF THE INVENTION

The present invention has for an object to overcome the above problem and to enable regenerator errors to be detected without having to detect frames and then compute parity.

Accordingly the present invention consists in a system for transmitting digital data by TDM, and wherein the system includes means for introducing mark parity into a frame structure having fixed stuff bytes forming part of the payload and/or frame overheads but not normally available to the user, and wherein the system further includes a transmission terminal having processor means operative to locate and overwrite the fixed stuff bytes in order to introduce mark parity, and a receive terminal having processor means for detecting the introduced parity bytes and determining whether or not there has been an error in transmission.

In accordance with a feature of the invention the processor of the receive terminal may be operative to overwrite the introduced mark parity bytes to a fixed condition corresponding to their original state, normally logic zero.

BRIEF DESCRIPTION OF THE DRAWINGS

In order that the invention may be more readily understood, an embodiment thereof will now be described by way of example and with reference to the accompanying drawings, in which; FIG. 1 is a representation of a synchronous digital hierarchy frame used in TDM data transmission; FIG. 2 is a conventional way of showing the frame of FIG. 1.

DETAILED DESCRIPTION OF THE PREFERRED EMBODIMENTS

Figure 3:
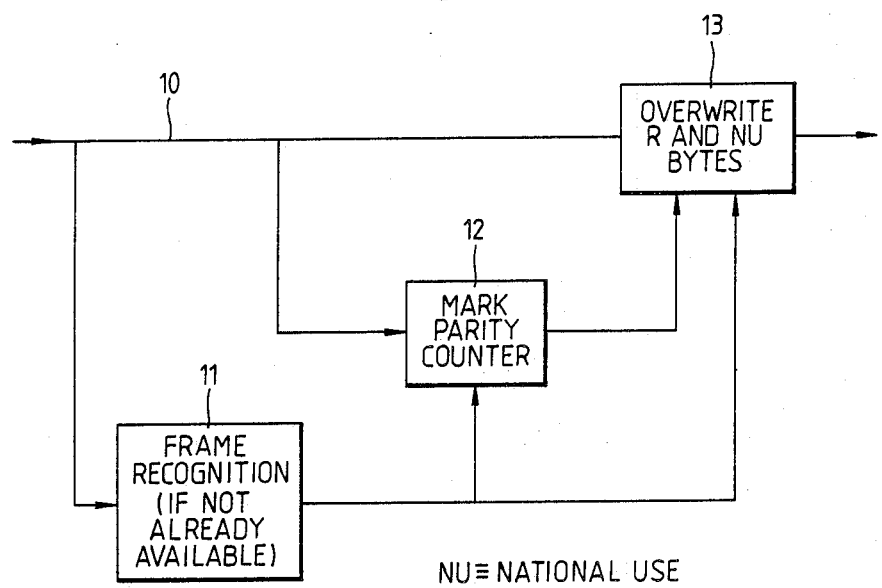
FIG. 3 is a block diagram of a circuit for introducing Mark Parity.

The frame shown in FIG. 1 is 125 microseconds long and contains 2430 bytes at 155.52 Mbit/s. The frame consists of nine equal length segments with a burst of nine overhead bytes at the start of each segment. The remaining bytes contain a mixture of traffic and further overhead bytes depending on the types of traffic being carried. Examples of the types of traffic are 64×2 Mbit/s, 3×45 Mbit/s etc.

The nine segments are shown at 10 and the overhead bytes associated with each segment 10 are shown at 11.

Referring now to FIG. 2 of the drawings this shows a conventional representation of the frame shown in FIG. 1.

In FIG. 2 the segments 10 of FIG. 1 are shown as nine rows 1-9. It is also conventional that each tributary signal, with its own overheads, occupies a number of complete and relatively even-spaced columns. Each column (A -------L) contains nine bytes, that is one from each row, with each byte representing 64 Kbit/s of capacity a total of 576 Kbit/s per column. With this form of representation each 2 Mbit/s tributary occupies four columns (2304 Kbit/s total) whilst 1.5 Mbit/s (DSl) tributaries each occupy three columns (1728 Kbit/s total).

Each group of columns which supports a tributary is called a tributary unit (TU).

Further overhead bits and bytes are contained within the stream of bits corresponding to a TU. Some of these are used for frequency justification, some for low rate communication and some for information to locate all of the other overhead bits or bytes. The latter are known as pointers and are located at known places in the columns and the numerical values contained in them indicate the positions of the other overhead bits and bytes. Thus the other overhead bits and bytes are free to move within the columns as clock tolerances demand. Among the bytes which can be free to move are some denoted in the CCITT standard G 702 as reserved or "R" bytes. These bytes are not to be used as payload as far as the standard is concerned.

In accordance with the present invention the processor of a transmitting terminal detects the presence of bytes available for mark parity bytes and overwrites them to provide mark parity information. As a minimum, these include the R bytes and the 38 bytes presently allocated in the SDH frame for National use (NU bytes). At the receiving terminal the mark parity information is detected and used to check for regenerator errors.

The introduction of the mark parity information into the TDM data stream at the transmission terminal is done so that the parity of marks in a specified interval is even. Mark parity is defined as EVEN when the number of marks between specified instants is even. The period between the specified instants may be constant or variable.

FIG. 3 shows a basic circuit for introducing Mark Parity. A TDM data stream on line 10 has the presence of frames detected by a circuit 11. A Mark Parity counter 12 receives an input from circuit 11 as does an overwrite circuit 13. This latter circuit overwrites those fixed stuff bytes made up by the "R" bytes and the NU bytes to give Mark Parity to the TDM Signal.

Figure 4:
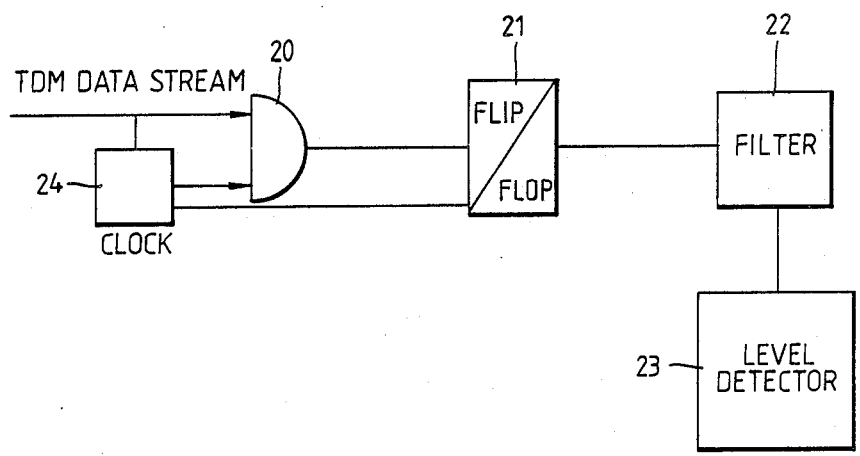
FIG. 4 is a block diagram for detecting mark parity errors.

For the detection of errors of a transmitted signal carrying the mark parity information the circuit shown in FIG. 4 can be used.

This circuit comprises an AND gate 20 to which the transmitted TDM signal to be monitored and a clock signal are fed. The clock signal is generated by a clock signal generator circuit 24 which extracts the signal from the incoming data stream. The signal passed by gate 20 is supplied to a bistable flip-flop 21 which operates on each mark. The output of bistable is filtered by a band pass filter 22 having a characteristic response, such that changes in d.c. level produce alternate positive and negative pulses with respect to a mean voltage level.

If there are no errors in the received signal the output of bistable flip-flop 21 will be a steady state d.c. signal after each of the inserted parity bits has been received. On the other hand if there is an error in the received bits which violates the parity, that is a single or odd number of errors the output of the bistable will change after it has received the next parity check digit. Conversely if an error occurs in the parity bits the output of bistable flip-flop 21 will change. This change will be detected at the output of filter 22. After a single error has occurred the bistable 21 will be in a different state when the next parity check digit is received. The result is that the bistable flip-flop 21 now operates in the reverse mode so that the changed d.c. level after the first detected error becomes a new steady state - d.c. signal at a different level. This process repeats for subsequent errors with the steady state d.c. signal changing at each occurrence of error detection.

We claim:

1. A system for transmitting digital data by time division multiplex (TDM), the system comprising: a transmission terminal for transmitting a TDM data stream having a frame structure which includes user-unavailable bytes forming part of the payload but not normally available to the user, and a receive terminal for the data stream, the transmission terminal having processor means for locating said user-unavailable bytes, and means for overwriting at least some of said user-unavailable bytes to introduce mark parity, and the receive terminal having means for detecting the introduced parity bytes and determining whether there has been an error in transmission.

2. A system as claimed in claim 1 wherein the transmission terminal includes a frame recognition circuit connected to a mark parity counter and to an overwrite circuit operative to overwrite selected user unavailable bytes in the TDM data stream.

3. A system as claimed in claim 2 wherein the receive terminal includes an AND-gate to which the transmitted TDM signal containing mark parity is fed, means for supplying a clock signal to said AND-gate, a bistable flip-flop connected to the output of said AND-gate, and a band pass filter for filtering the output of said AND-gate.

* * * * *